(12) United States Patent
Sayeedi et al.

(10) Patent No.: US 7,512,110 B2
(45) Date of Patent: *Mar. 31, 2009

(54) METHOD AND APPARATUS TO FACILITATE INTER-AN HRPD HARD HANDOFF

(75) Inventors: Shahab M. Sayeedi, Naperville, IL (US); Shreesha Ramanna, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 406 days.

This patent is subject to a terminal disclaimer.

(21) Appl. No.: 11/226,589

(22) Filed: Sep. 14, 2005

(65) Prior Publication Data

US 2006/0062180 A1 Mar. 23, 2006

Related U.S. Application Data

(62) Division of application No. 11/225,236, filed on Sep. 13, 2005.

(60) Provisional application No. 60/611,762, filed on Sep. 21, 2004.

(51) Int. Cl.
*H04J 3/24* (2006.01)

(52) U.S. Cl. ............... 370/349; 370/328; 370/329; 370/331; 370/395.3; 455/436; 455/443; 455/450; 709/229

(58) Field of Classification Search ........... 455/414.4, 455/435.1, 436–440, 443, 450, 451; 370/328, 370/331, 349, 395.3, 395.52, 395.64, 902, 370/912, 913, 329; 709/229
See application file for complete search history.

(56) References Cited

U.S. PATENT DOCUMENTS 6,947,399 B1 9/2005 Sen et al.
7,420,943 B2 9/2008 Narayanan et al.
2002/0067706 A1 6/2002 Bautz et al.
2002/0067707 A1* 6/2002 Morales et al. ............. 370/331
2003/0053430 A1 3/2003 Choi et al.

(Continued)

FOREIGN PATENT DOCUMENTS

WO 0018174 3/2000

(Continued)

OTHER PUBLICATIONS

3GPP2 A.S0013-B, Version 1.0, Apr. 2004, 3G: 3rd Generation Partnership Project 2 "2GPP2", Interoperability Specification (IOS) for cdma2000 Access Network Interfaces-Part 3 Features, 3G-IOSv4.3.1, pp. 182-186.

(Continued)

*Primary Examiner*—Nghi H Ly

(57) ABSTRACT

Various embodiments are described to address the need for reduced handoff delays associated with inter-AN (access network) HRPD (High Rate Packet Data)/1XEV-DO handoffs. The disclosed approach enables an AT (101) with an active packet data session to perform a hard handoff from a source AN (121, 221) to a target AN (122, 222) without having to force the data session dormant. Unlike known hard handoff approaches that involve coordination by a mobile switching center (MSC), the disclosed approach uses peer-to-peer signaling with no MSC involvement, such as that between source and target ANs or PCFs (131, 132, 231, 232). For example, data session information at the source side is transferred via new A13 messaging to the source entity's target-side peer to otherwise reduce signaling between the source and target equipment.

17 Claims, 7 Drawing Sheets

U.S. PATENT DOCUMENTS

| | | | |
|---|---|---|---|
| 2003/0142648 A1* | 7/2003 | Semper | 370/331 |
| 2003/0145091 A1* | 7/2003 | Peng et al. | 709/229 |
| 2003/0223427 A1* | 12/2003 | Chang et al. | 370/395.3 |
| 2003/0224792 A1 | 12/2003 | Verma et al. | |
| 2004/0085931 A1* | 5/2004 | Rezaiifar | 370/331 |
| 2004/0184424 A1* | 9/2004 | Shibata et al. | 370/331 |
| 2004/0203771 A1* | 10/2004 | Chang et al. | 455/435.1 |
| 2004/0214574 A1* | 10/2004 | Eyuboglu et al. | 455/439 |
| 2004/0248577 A1* | 12/2004 | Sayeedi | 455/445 |
| 2005/0078634 A1 | 4/2005 | Seo | |
| 2005/0096055 A1* | 5/2005 | Colban et al. | 455/442 |
| 2005/0188113 A1 | 8/2005 | Lee et al. | |
| 2005/0232198 A1 | 10/2005 | McCann et al. | |
| 2005/0276273 A1* | 12/2005 | Oprescu-Surcobe et al. | 370/401 |
| 2006/0187883 A1* | 8/2006 | Abrol et al. | 370/331 |

OTHER PUBLICATIONS

TIA-878-1, IOS HRPD, TR45, Interoperability Specification (IOS) for High Rate Packet Data (HRPD) Access Network Interfaces, TIA-878-1, Publication Version: May 2003, pp. 3-15 and 3-16.

TIA Document, "Interoperability Specification (IOS) for High Rate Packet Data (HRPD) Access Network Interfaces—Alternative Architecture", TIA-1878, May 2003, Telecommunications Industry Association, pp. 3-25, 3-29 through 3-30.

\* cited by examiner

METHOD AND APPARATUS TO FACILITATE INTER-AN HRPD HARD HANDOFF

REFERENCE(S) TO RELATED APPLICATION(S)

The present application is a divisional application of a co-pending application having Ser. No. 11/225,236, entitled "METHOD AND APPARATUS TO FACILITATE INTER-AN HRPD HANDOFF," filed Sep. 13, 2005, which is commonly owned and incorporated herein by reference in its entirety.

The present application claims priority from provisional application, Ser. No. 60/611,762, entitled "METHOD AND APPARATUS TO FACILITATE INTER-AN HRPD HARD HANDOFF," filed Sep. 21, 2004, which is commonly owned and incorporated herein by reference in its entirety.

This application is related to a co-pending application, Ser. No. 11/141,926, entitled "METHOD AND APPARATUS TO FACILITATE INTER-OPERABILITY BETWEEN A 3G1X NETWORK AND A WIRELESS PACKET DATA NETWORK," filed Jun. 1, 2005, which is assigned to the assignee of the present application.

FIELD OF THE INVENTION

The present invention relates generally to wireless communication systems and, in particular, to facilitating inter-AN (access network) HRPD (High Rate Packet Data) hard handoffs.

BACKGROUND OF THE INVENTION

Existing High Rate Packet Data (HRPD)/1XEV-DO (DO) systems function in accordance with interface standards developed by 3GPP2/TIA. 3GPP2 refers to the 3rd Generation Partnership Project 2, which may be contacted via its web page at www.3gpp2.com, and TIA refers to the Telecommunications Industry Association, which may be contacted via its web page at www.tiaonline.org. HRPD systems typically employ air interfaces in accordance with TIA-856, while their network architectures are structured according to either the TIA-878 or the TIA-1878 specifications. At present, these specifications do not provide for active packet data session hard handoffs between ANs in HRPD networks.

Instead, the specifications require an HRPD packet data session to be transitioned to the dormant state before it can be handed off (dormant mode handoff) to a target HRPD AN. FIG. 5 is an exemplary signaling flow diagram 700 that depicts an access terminal (AT) with an active HRPD packet data session handing off from a source AN to a target AN, in accordance with prior art signaling techniques. As flow diagram 700 illustrates, the source AT breaks the connection with the AT, forcing the packet data session dormant, before establishing a connection with the target AN. Additional signaling detail may be found in TIA-1878. See for example section 3.5.3 (showing HRPD session release initiated by the source AN with an A8 connection active) and dormant mode handoff sections such as section 3.7.1 (showing successful network initiated, target side signaling for the dormant mode handoff and reactivation of the session).

Although the session is re-activated once the dormant session is successfully transferred to the target AN, this prior art signaling approach adds significant delay to the handoff. Such a delay can be unacceptable to applications with stringent QoS (quality of service) requirements, such as VoIP (voice over internet protocol). This prior art approach can thus result in disruptive data service leading to a poor user experience. Accordingly, it would be desirable to have a method and apparatus to facilitate inter-AN HRPD hard handoffs that can reduce the present handoff delays.

Specific embodiments of the present invention are disclosed below with reference to FIGS. 1-4. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described to address the need for reduced handoff delays associated with inter-AN (access network) HRPD (High Rate Packet Data)/1XEV-DO handoffs. The disclosed approach enables an AT with an active packet data session to perform a hard handoff from a source AN to a target AN without having to force the data session dormant. Unlike known hard handoff approaches that involve coordination by a mobile switching center (MSC) (See e.g., IOS A.S0013-B, section 3.17.5.10), the disclosed approach uses peer-to-peer signaling with no MSC involvement, such as that between source and target ANs or PCFs. For example, data session information at the source side is transferred via new A13 messaging to the source entity's target-side peer to otherwise reduce signaling between the source and target equipment.

Figure 1:
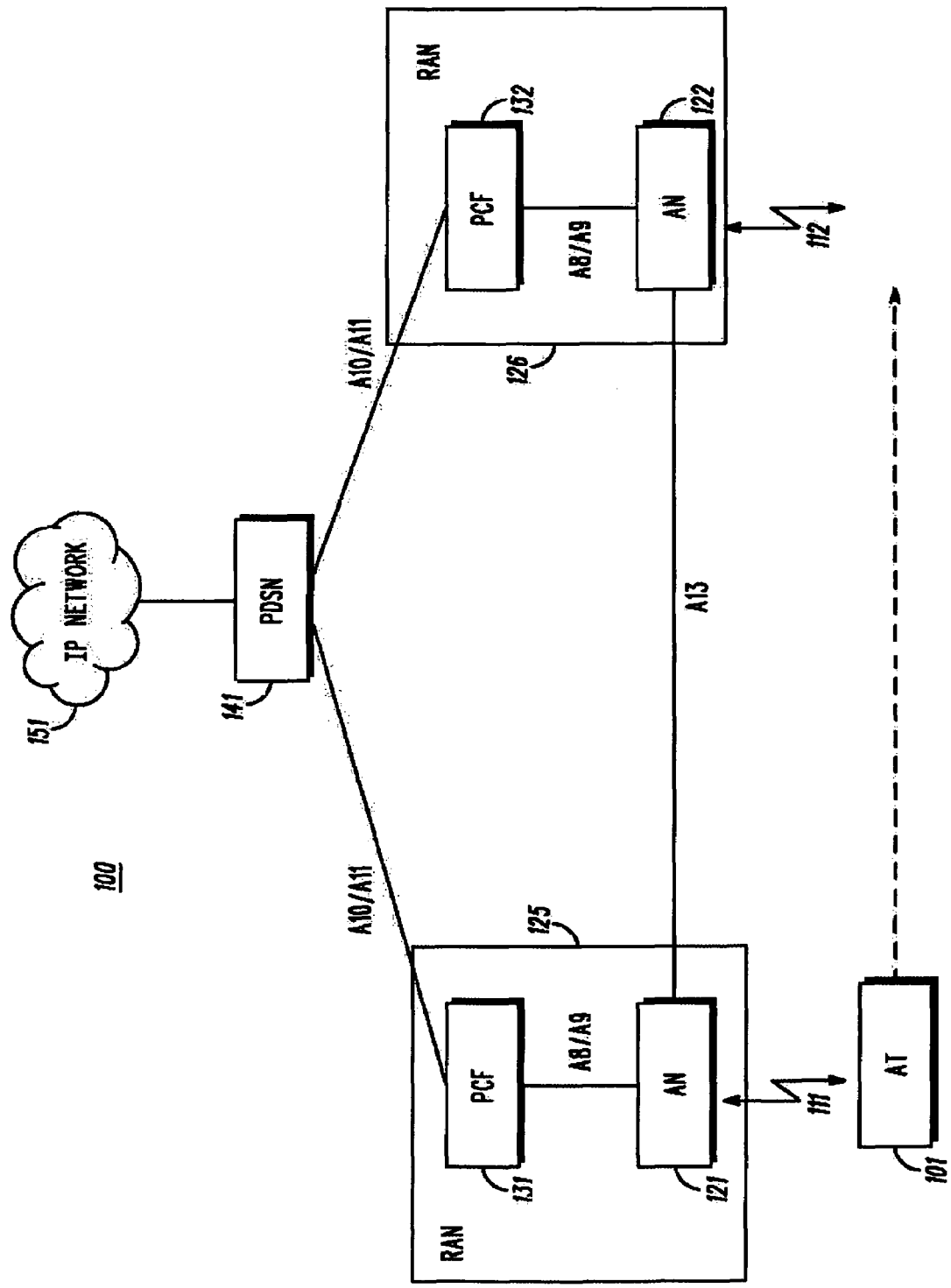
FIG. 1 is a block diagram depiction of a wireless communication system in accordance with TIA-878-directed embodiments of the present invention.
Figure 2:
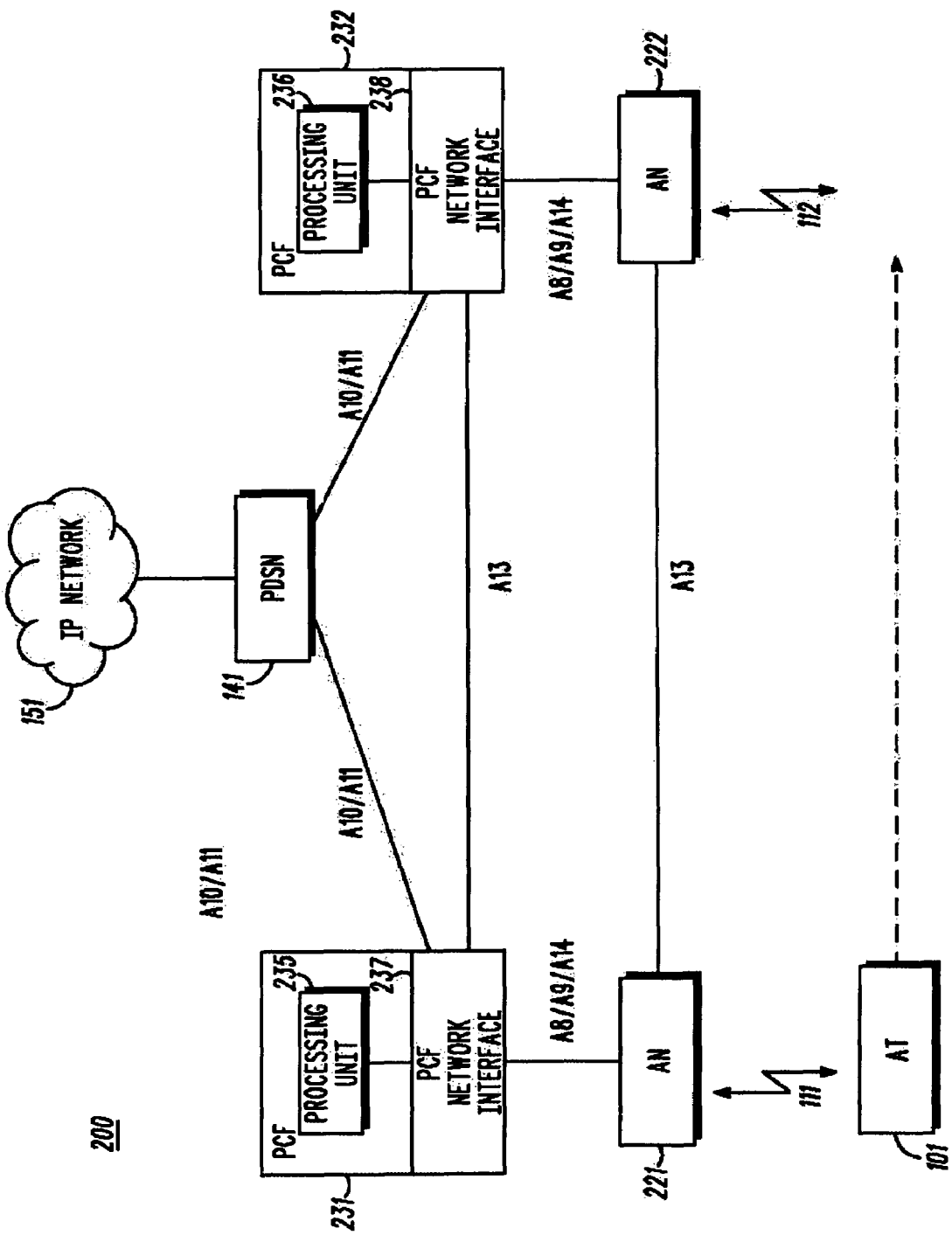
FIG. 2 is a block diagram depiction of a wireless communication system in accordance with TIA-1878-directed embodiments of the present invention.

The disclosed embodiments can be more fully understood with reference to FIGS. 1-4. FIG. 1 is a block diagram depiction of a wireless communication system 100 in accordance with TIA-878-directed embodiments of the present invention, while FIG. 2 is a block diagram depiction of a wireless communication system 200 in accordance with TIA-1878-directed embodiments of the present invention. Communication systems 100 and 200 are well-known High Rate Packet Data (HRPD)/1XEV-DO (DO) Code Division Multiple Access (CDMA) systems, suitably modified to implement the present invention.

Those skilled in the art will recognize that FIGS. 1 and 2 do not depict all of the network equipment necessary for respective systems 100 and 200 to operate but only those system components and logical entities particularly relevant to the description of embodiments of the present invention. In particular, the network equipment of system 100 comprises components such as radio access networks (RANs) 125 and 126, access networks (ANs) 121 and 122, packet control functions (PCFs) 131 and 132, packet data serving node (PDSN) 141, and internet protocol (IP) network 151. Similarly, the network equipment of system 200 comprises components such as access networks (ANs) 221 and 222, packet control functions (PCFs) 231 and 232, packet data serving node (PDSN) 141, and internet protocol (IP) network 151. Generally, RANs, ANs, PCFs, PDSNs, and IP networks are known in the art. For example, RANs are well-known to comprise ANs and PCFs, and PCFs are well-known to comprise components such as processing units and PCF network interfaces. Additionally, ANs are well-known to comprise components such as controllers and access network transceiver systems (ANTSs), neither of which are specifically shown in FIG. 1 or 2.

PCFs 231 and 232 are depicted in FIG. 2 as comprising processing units 235 and 236 and PCF network interfaces 237 and 238. In general, components such as processing units and network interfaces are well-known. For example, processing units are known to comprise basic components such as, but not limited to, microprocessors, microcontrollers, memory devices, and/or logic circuitry. Such components are typically adapted to implement algorithms and/or protocols that have been expressed using high-level design languages or descriptions, expressed using computer instructions, expressed using messaging/signaling flow diagrams, expressed using call flow diagrams, and/or expressed using logic flow diagrams.

Thus, given an algorithm, a logic flow, a messaging/signaling flow, a call flow, and/or a protocol specification, those skilled in the art are aware of the many design and development techniques available to implement a PCF that performs the given logic. Therefore, PCFs 231 and 232 represent known PCFs that have been adapted, in accordance with the description herein, to implement multiple embodiments of the present invention. Similarly, RANs 125 and 126 represent known RANs that have been adapted, in accordance with the description herein, to implement multiple embodiments of the present invention.

RANs 125 and 126 and ANs 221 and 222 use air interfaces 111 and 112 for communication with remote unit 101. Air interfaces 111 and 112 are HRPD/1xEV-DO air interfaces in accordance with TIA-856. HRPD/1xEV-DO terminology refers to remote units as access terminals (ATs), as does the present application throughout. Typically, remote unit/AT platforms are known in the art to include devices such as mobile phones, computers, personal digital assistants, gaming devices, etc. In particular, AT 101 comprises component devices (none shown) such as a processor and a transceiver, both well-known in the art.

Relevant aspects of the operation of TIA-878-directed embodiments will be described with reference to FIG. 1. Source RAN 125, which comprises source AN 121 and source PCF 131, supports an already active HRPD packet data session for AT 101. For the purpose of illustration it is assumed that AT 101 discovers a strong neighboring cell. Accordingly, AN 121 receives a route update message from AT 101 indicating the potential handoff target. Again for the purpose of illustration, it is assumed that this potential handoff target is within RAN 126 rather than RAN 125. Thus, while continuing to support the active session AN 121 determines that AT 101 should handoff to RAN 126 and sends a handoff request for AT 101 to target RAN 126. This handoff request is sent to enable AT 101 to handoff without the session transitioning to a dormant mode or dropping (a dropped session requires the packet data call to be re-established). In some embodiments, this handoff request includes the following information: a mobile node identifier of AT 101, a handoff target sector identifier, target channel information, a serving PDSN internet protocol (IP) address (i.e., the IP address of PDSN 141), a source access network identifier, a source AN UATI for AT 101, a session state information record for the HRPD packet data session (which may include the source RAN UATI for AT 101 to be used by target RAN 126 in receiving AT 101's initial signaling), a security layer packet, an anchor PDSN address, an anchor P-P address, and an air interface version indicator. In other embodiments, a subset of this information or none of this information may be conveyed in the handoff request.

AN 122 of RAN 126 receives the handoff request for AT 101 and responds with a handoff request acknowledgment that indicates that the handoff request was accepted by target RAN 126 (it is assumed to be accepted for the purpose of illustration, but it could of course be rejected). In some embodiments, the handoff request acknowledgment also includes handoff-related information such as a mobile node identifier of AT 101, a handoff target sector identifier, and at least a portion of a traffic channel assignment message to be sent to AT 101. In other embodiments, a subset of this information or none of this information may be conveyed in the handoff request acknowledgment.

AN 121 of RAN 125 receives the handoff request acknowledgment that indicates that the handoff request was accepted by the target RAN. Since AT 101 is going to handoff to target RAN 126, PCF 131 of RAN 125 may request PDSN 141 to cease data transmission to source RAN 125 for the session. After receiving the handoff request acknowledgment, AN 121 also sends traffic channel assignment signaling to AT 101 that assigns a new active set, supported at least in part by target RAN 126. Thus, AT 101 is able to handoff without the HRPD packet data session transitioning to a dormant mode or dropping. Moreover, the traffic channel assignment signaling sent to AT 101 can include the portion that was sent to AN 121 via the handoff request acknowledgment or other signaling means.

In response to the traffic channel assignment signaling, target AN 122 receives traffic channel complete signaling from AT 101. Basically, traffic channel complete signaling serves to acknowledge the traffic channel assignment signaling received by AT 101. Also, target AN 122 uses the unicast access terminal identifier (UATI) of AT 101 that was used at source RAN 125 to decode the traffic channel complete signaling. In response to the traffic channel complete signaling, target AN 122 sends AT 101 a new UATI assignment and receives UATI complete signaling in acknowledgment. In addition to signaling with AT 101, RAN 126 (i.e., PCF 132) sends PDSN 141 a request to establish a data connection for AT 101's session and receives an indication that the data connection is accepted. AN 122 and PCF 132 are thus able to support an active HRPD packet data session for AT 101 after AT 101 hands off and without requiring the session to handoff in a dormant mode or to drop.

AN 122 also sends handoff status signaling to RAN 125 that indicates that AT 101 has successfully handed off to target RAN 126. In response to receiving this handoff status signaling, RAN 125 sends PDSN 141 an indication to release the resources via source RAN 125 that supported the data session for AT 101.

Relevant aspects of the operation of TIA-1878-directed embodiments will be described with reference to FIG. 2. Source AN 221 and source PCF 231 (i.e., PCF processing unit 235 via PCF network interface 237) support an already active HRPD packet data session for AT 101. For the purpose of illustration it is assumed that AT 101 discovers a strong neighboring cell. Accordingly, AN 221 receives a route update message from AT 101 indicating the potential handoff target. Again for the purpose of illustration, it is assumed that this potential handoff target is within AN 222 rather than AN 221. Thus, while continuing to support the active session AN 221 determines that AT 101 should handoff to AN 222 and sends handoff required signaling to PCF 231.

While continuing to support the active session, PCF processing unit 235 via PCF network interface 237 receives the handoff required signaling. This signaling indicates a handoff of AT 101 to target AN 222 by which AT 101 is able to handoff without forcing the data session into a dormant mode or to drop. In some embodiments, this handoff required signaling includes the following information: an AT identifier, a handoff target sector identifier, a signaling correlation identifier, target channel information, and an air interface version indicator. In other embodiments, a subset of this information may be conveyed in the handoff required signaling.

After determining that target AN 222 is supported by target PCF 232, PCF processing unit 235 via PCF network interface 237 sends to PCF 232 a handoff request for AT 101. This handoff request is sent to enable AT 101 to handoff without the session transitioning to a dormant mode or dropping. In some embodiments, this handoff request includes the following information: a mobile node identifier of AT 101, a handoff target sector identifier, target channel information, a serving PDSN internet protocol (IP) address (i.e., the IP address of PDSN 141), a source access network identifier, a source AN UATI for AT 101, a session state information record for the HRPD packet data session (which may include the source AN UATI for AT 101 to be used by target AN 222 in acquiring AT 101), a security layer packet, an anchor PDSN address, an anchor P-P address, and an air interface version indicator. In other embodiments, a subset of this information or none of this information may be conveyed in the handoff request.

PCF processing unit 236 via PCF network interface 238 receives the handoff request (or "PCF handoff request") and, based on this PCF handoff request, sends to AN 222 an AN handoff request for AT 101. In some embodiments, this AN handoff request includes the following information: an AT identifier, a signaling correlation identifier, a handoff target sector identifier, a source AN UATI for AT 101, a session state information record for the HRPD packet data session (which may include the source AN UATI for AT 101 to be used by target AN 222 in acquiring AT 101), A14-specific indicators, target channel information, and an air interface version indicator. In other embodiments, a subset of this information may be conveyed instead. In response, PCF processing unit 236 via PCF network interface 238 receives from target AN 222 an indication that the target AN has accepted the handoff of AT 101. In some embodiments, this indication that the target AN has accepted the handoff includes a signaling correlation identifier and at least a portion of an air interface traffic channel assignment message to be sent to AT 101. However, in other embodiments, a subset of this information or none of this information may be conveyed in such a handoff acceptance indication.

In response, PCF processing unit 236 via PCF network interface 238 sends a PCF handoff request acknowledgment to source PCF 231 that indicates that the earlier PCF handoff request was accepted by target PCF 232. In some embodiments, this PCF handoff request acknowledgment includes a mobile node identifier of AT 101, a handoff target sector identifier, and at least a portion of an air interface traffic channel assignment message to be sent to AT 101 (e.g., as received in the handoff acceptance indication). In other embodiments, however, a subset of this information (including none) may be conveyed instead.

In response to receiving the PCF handoff request acknowledgment, PCF processing unit 235 via PCF network interface 237 sends a handoff required acknowledgment to source AN 221 that indicates that the handoff of AT 101 to target AN 222 was accepted by target PCF 232. In some embodiments, this PCF handoff request acknowledgment includes an AT identifier, a signaling correlation identifier, and at least a portion of a traffic channel assignment message to be sent to the AT 101 (e.g., as received in the PCF handoff request acknowledgment). In other embodiments, however, a subset of this information (including none) may be conveyed instead.

Having received the indication that the handoff of AT 101 to target AN 222 was accepted by target PCF 232, source AN 221 requests PCF 231 to cease data transmission to itself for the data session. Receiving this request, PCF processing unit 235 via PCF network interface 237 may request PDSN 141 to cease data transmission to itself for the data session if flow control is supported.

After AT 101 begins communicating with target AN 222, PCF processing unit 236 via PCF network interface 238 receives from target AN 222 a request for a UATI for AT 101. In response to this request, PCF processing unit 236 via PCF network interface 238 sends a UATI assignment for AT 101 to target AN 222.

At some point after receiving the initial handoff request from source PCF 231, PCF processing unit 236 via PCF network interface 238 sends PDSN 141 a request to establish a data connection for AT 101's session and receives an indication that the data connection is accepted. AN 222 and PCF 232 are thus able to support an active HRPD packet data session for AT 101 after AT 101 hands off and without requiring the session to handoff in a dormant mode or to drop.

Also, target PCF 232 sends handoff status signaling to source PCF 231 that indicates that AT 101 has successfully handed off to target AN 222. In response to receiving this handoff status signaling, PCF processing unit 235 via PCF network interface 237 sends to source AN 221 a request to disconnect the data connection between source PCF 231 and source AN 221 supporting the session and also sends PDSN 141 a request to release A10 connections with PCF 231 for the session.

Thus, a number of embodiments have been described that address the need for reduced handoff delays associated with inter-AN HRPD/1XEV-DO hard handoffs. Again, the approaches disclosed above and in even greater detail below enable an AT with an active packet data session to perform a hard handoff from a source AN to a target AN without having to force the data session dormant or to drop.

Figure 3A:
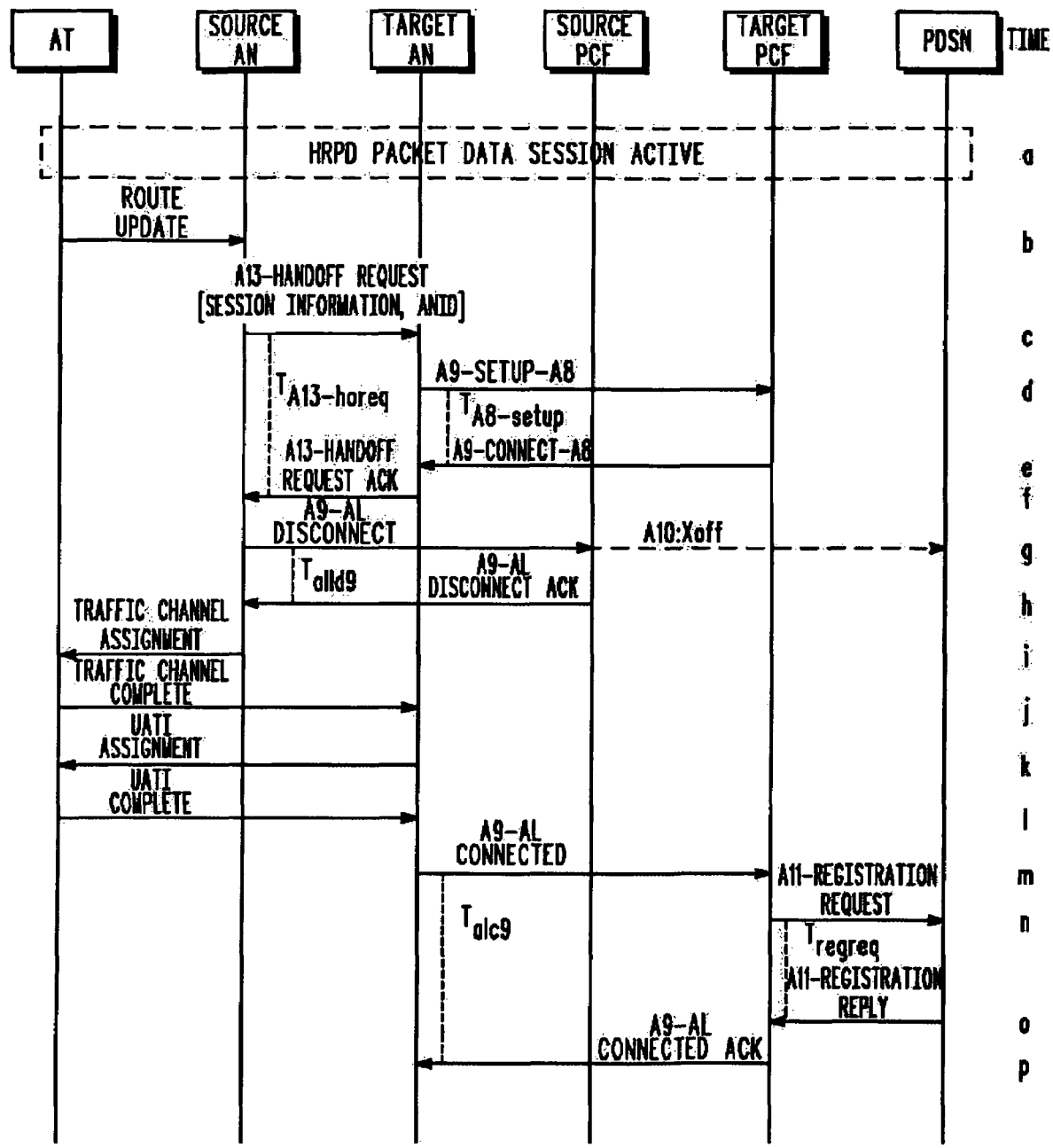
FIGS. 3A-3B, considered together (hereinafter "FIG. 3"), form an exemplary signaling flow diagram that depicts an access terminal (AT) with an active HRPD packet data session handing off from a source AN to a target AN, in accordance with TIA-878-directed embodiments of the present invention.
Figure 3B:
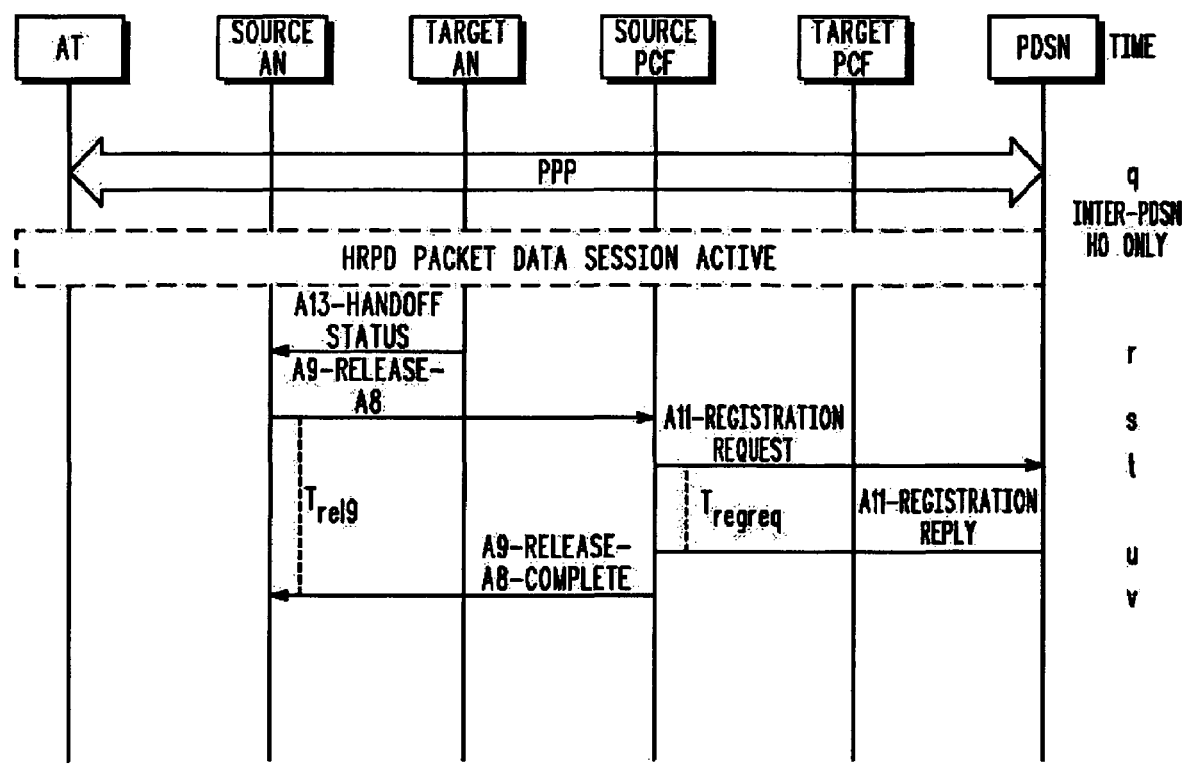

FIG. 3 is an exemplary signaling flow diagram that depicts an access terminal (AT) with an active HRPD packet data session handing off from a source AN to a target AN, in accordance with TIA-878-directed embodiments of the present invention. The following is a detailed description of the exemplary signaling flow timeline as labeled on the rightmost column of FIG. 3 (message definitions may be found below, towards the end of the present Detailed Description of Embodiments section):

a. An active packet data session is supported by the AT, source AN, source PCF, and PDSN (traffic channel and neighbor list was allocated to AT by AN, A8/A10 bearer connections are established, and a PPP connection exists between the AT and PDSN).
b. The AT sends a Route Update message to the source AN indicating a strong neighbor(s) which is not under the domain of the source AN.
c. Upon determination that the target cell is within the domain of another AN, the source AN sends an A13-Handoff Request to the target AN which supports the target cell. The source AN includes the AT's session information, target cell information, the ANID of the source PCF, the address of the PDSN currently supporting the call in the message. If fast handoff is supported, it includes the anchor PDSN and Anchor P-P Addresses. The message also includes the air interface version in use at the source so the target can format the air interface TCA message accordingly. The source AN starts timer $T_{A13\text{-}horeq}$.
d. The target AN sends an A9-Setup-A8 message to the target PCF to establish an A8 connection for the call and starts timer $T_{A8\text{-}setup}$. If an inter-PDSN HHO is required, the target PCF may initiate fast handoff procedures.
e. The target PCF responds by sending an A9-Connect-A8 message to the target AN. The target AN stops timer $T_{A8\text{-}setup}$.
f. The target AN sends an A13-Handoff Request Ack to the source AN acknowledging the handoff request from the target network. The message includes the air interface TrafficChannelAssignment message, formatted according the air interface version in use at the source network. Upon reception of the message, the source AN stops timer $T_{A13\text{-}horeq}$.
g. The source AN sends an A9-AI-Disconnect message to the source PCF requesting it to stop transmission of packet data to the AN, and starts timer $T_{ald9}$. The source PCF sends an inband flow control Xoff signal to the PDSN to halt data transmission to the source PCF if flow control is supported by the PDSN for the connection.
h. The source PCF responds with and A9-AI Disconnect Ack message to the source AN. The source AN stops timer stops timer $T_{ald9}$.
i. The source AN sends a TrafficChannelAssignment message to the AT with a new active set which includes the target cell. This message may be sent anytime after step 'f'.
j. The AT responds with a TrafficChannelComplete message to the target AN. This step may be sent any time after step 'f'.
k. The AN sends a UATIAssignment message to assign the UATI to the AT.
l. The AT sends a UATIComplete message to notify the AN that it received the UATIAssignment message. The target AN may initiate session negotiation and/or termination authentication procedures after this step if required. If a failure occurs, the A13-Handoff Status message may be sent indicating the failure.
m. The target BS sends an A9-AL Connected message to the target PCF and starts timer $T_{alc9}$.
n. This step occurs if fast handoff procedures were not initiated in step 'd'. The PCF selects the PDSN sent by the source AN in the A13-Handoff Request. If the target PCF cannot connect to the source PDSN, it selects an alternate PDSN using the PDSN selection algorithm. The target PCF sends an A11-Registration Request message to the PDSN. The message includes the MEI indication within a CVSE, a non-zero Lifetime value, accounting data (A10 Connection Setup and perhaps Active-Start Airlink records), and the ANID of the source PCF (PANID) and the ANID of the target PCF (CANID) within an NVSE. The target PCF starts timer $T_{regreq}$.
o. The PDSN validates the A11-Registration Request and accepts the connection by returning an A11-Registration Reply message with an accept indication and the Lifetime field set to the configured $T_{rp}$ value. The target PCF stops timer $T_{regreq}$.
p. The target PCF sends the A9-AL Connected Ack message in response to the A9-AL Connected message and stops timer $T_{alc9}$.
q. If the target PCF was unable to connect to the source PDSN, i.e. the PDSN that supported the call prior to the handoff, PPP connection establishment and MIP registration procedures (if supported) are performed.

The HRPD packet data session is now active at the target cell and packet data is exchanged between the AT and PDSN.
r. The target AN sends an A13-Handoff Status message to the source AN with a cause value indicating the successful completion of the hard handoff to the target network.
s. The AN sends an A9-Release-A8 message with the cause value set to "hard handoff completed", to the PCF to request the PCF to release the associated dedicated resources. The AN starts timer $T_{rel9}$. The source PCF stops timer $T_{discon9}$.
t. The source PCF sends an A11-Registration Request message, with Lifetime set to zero and accounting records, to the PDSN. The PCF starts timer $T_{regreq}$.
u. The PDSN sends an A11-Registration Reply message to the source PCF. The source PCF closes the source A10 connection for the AT and stops timer $T_{regreq}$.
v. The source PCF responds to the A9-Release-A8 message with an A9-Release-A8 Complete message. The source AN stops timer $T_{rel9}$.

Figure 4A:
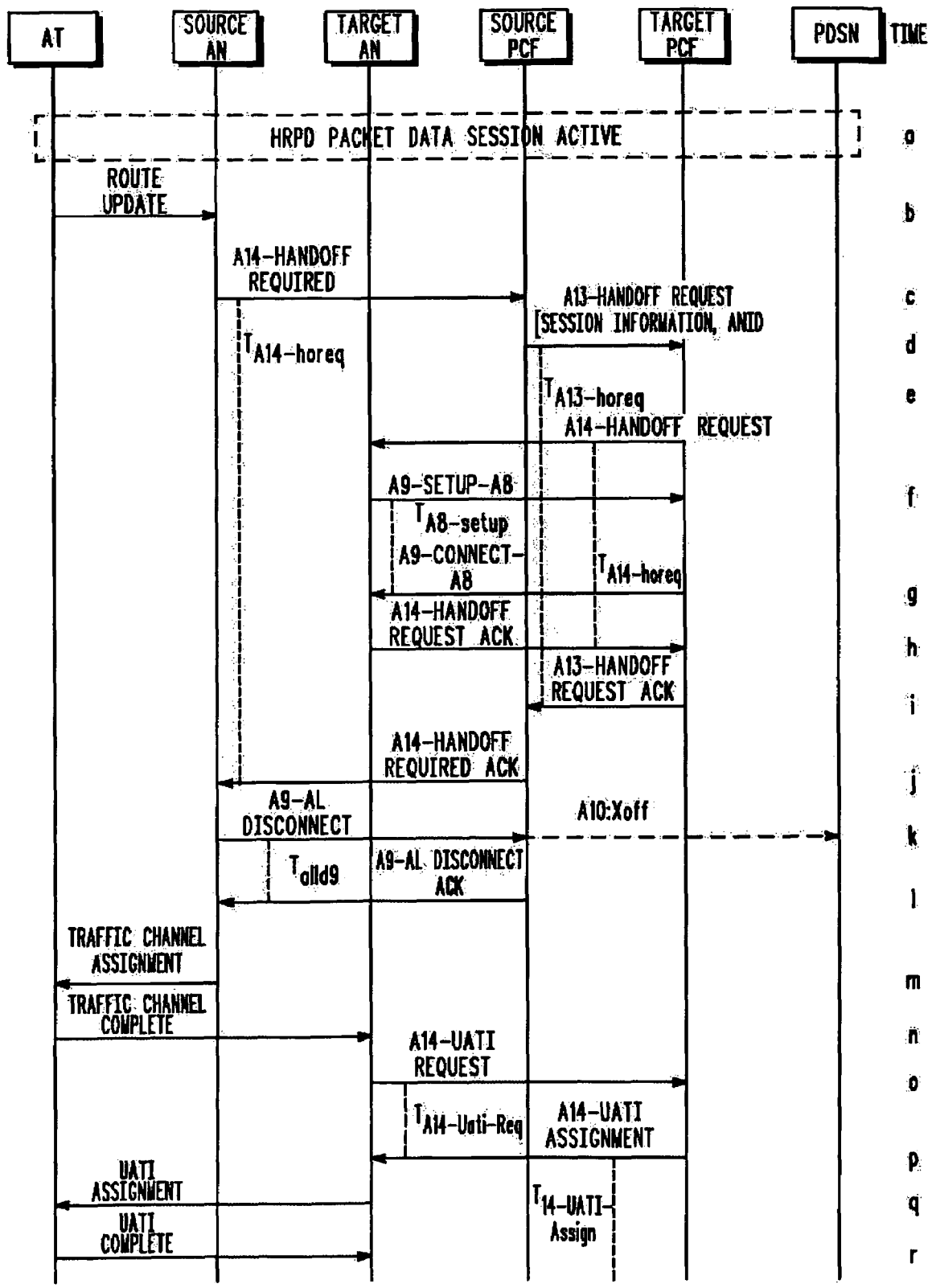
FIGS. 4A-4B, considered together (hereinafter "FIG. 4"), form an exemplary signaling flow diagram that depicts an access terminal (AT) with an active HRPD packet data session handing off from a source AN to a target AN, in accordance with TIA-878-directed embodiments of the present invention.
Figure 4B:
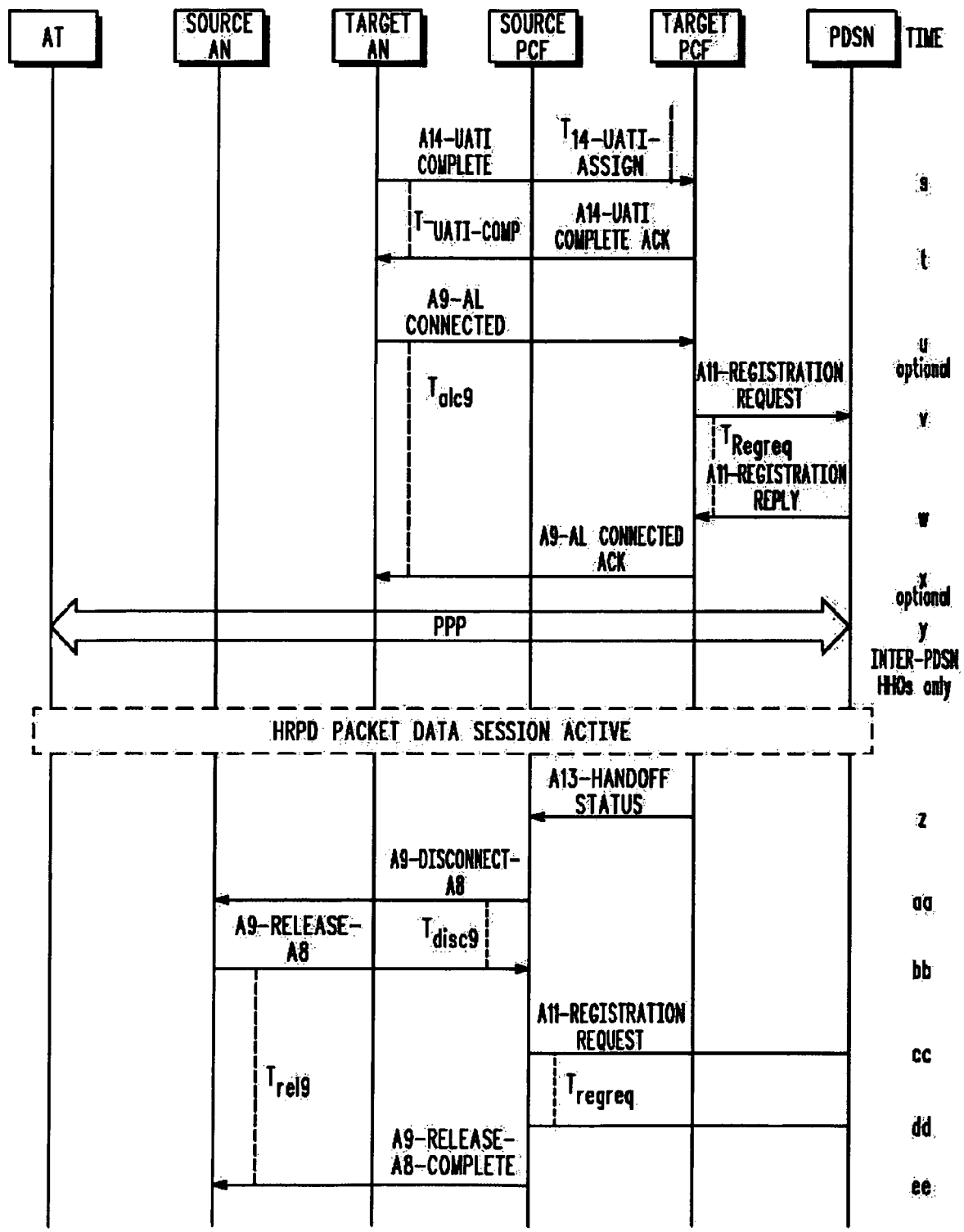
Figure 5:
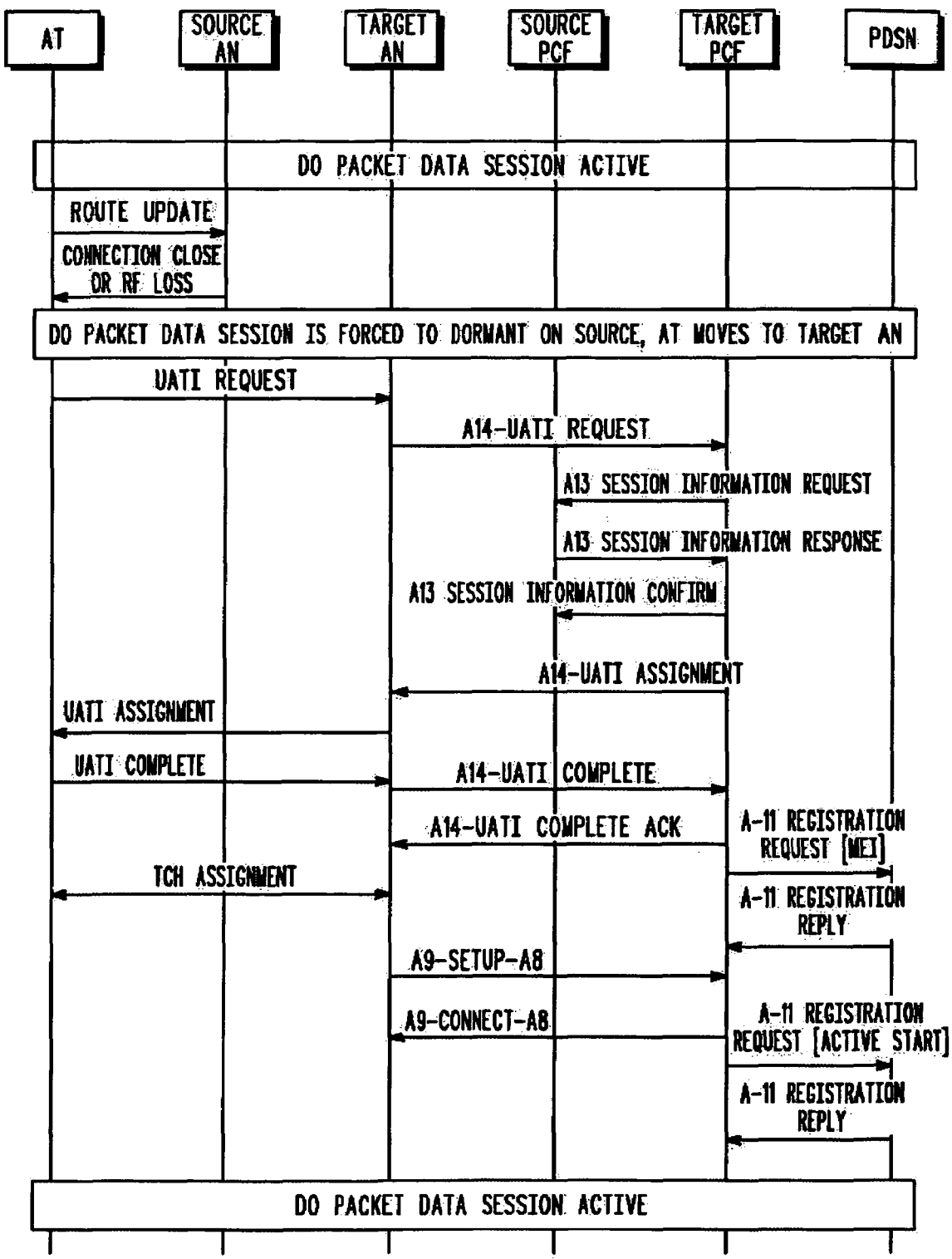
FIG. 5 is an exemplary signaling flow diagram that depicts an access terminal (AT) with an active HRPD packet data session handing off from a source AN to a target AN, in accordance with prior art signaling methods.

FIG. 4 is an exemplary signaling flow diagram that depicts an access terminal (AT) with an active HRPD packet data session handing off from a source AN to a target AN, in accordance with TIA-1878-directed embodiments of the present invention. The following is a detailed description of the exemplary signaling flow timeline as labeled on the rightmost column of FIG. 4:

a. An active packet data session is supported by the AT, source AN, source PCF, and PDSN (traffic channel and neighbor list was allocated to AT by AN, A8/A10 bearer connections are established, and a PPP connection exists between the AT and PDSN).
b. The AT sends a Route Update message to the source AN indicating a strong neighbor(s) which is not under the domain of the source AN.
c. The source AN sends an A14-Handoff Required message to the source PCF with the target cell pilot information (pilot). The source AN starts timer $T_{A14\text{-}horeq}$
d. Upon determination that the target cell is within the domain of another PCF [source PCF maintains neighbor cell to AN mapping information], the source PCF sends an A13-Handoff Request to the target PCF supporting the target AN. The source PCF includes the AT's session information, its ANID, target cell information, the address of the PDSN currently supporting the call in the message. If fast handoff is supported, it includes the anchor PDSN and Anchor P-P Addresses. The message also includes the air interface version in use at the source so the target can format the air interface TCA message accordingly. The source PCF starts timer $TA_{13\text{-}horeq}$.

e. The target PCF sends an A14-Handoff Request message to the target AN requesting a handoff for the AT to the target cell. The target PCF starts timer $T_{A14\text{-}horeq}$.

f. Upon reception of the A14-Handoff Request message at the target AN, if it can support the handoff, the target AN sends an A9-Setup-A8 message to the target PCF to establish an A8 connection for the call and starts timer $T_{A8\text{-}setup}$. If an inter-PDSN HHO is required, the target PCF may initiate fast handoff procedures.

g. The target PCF responds by sending an A9-Connect-A8 message to the target AN. The target AN stops timer $T_{A8\text{-}setup}$.

h. The target AN sends an A14-Handoff Request Ack message to the target PCF indicating that it will accept the handoff. The message includes the air interface TrafficChannelAssignment message, formatted according the air interface version in use at the source network. The target PCF stops timer $T_{A14\text{-}horeq}$.

i. The target PCF sends an A13-Handoff Request Ack to the source PCF acknowledging the handoff request from the source network. The message includes the air interface TrafficChannelAssignment message, formatted according the air interface version in use at the source network. Upon reception of the message, the source PCF stops timer $T_{A13\text{-}horeq}$.

j. The source PCF sends an A14-Handoff Required Ack message to the source AN with a cause value indicating that the handoff request was accepted and the air interface TrafficChannelAssignment message. The source AN stops timer $T_{A14\text{-}horeq}$.

k. The source AN sends an A9-AI-Disconnect message to the source PCF requesting it to stop transmission of packet data to the AN, and starts timer $T_{AId9}$. The source PCF sends an inband flow control Xoff signal to the PDSN to halt data transmission to the source PCF if flow control is supported by the PDSN for the connection.

l. The source PCF responds with an A9-AI Disconnect Ack message to the source AN. The source AN stops timer stops timer $T_{AId9}$.

m. The source AN sends a TrafficChannelAssignment message to the AT with a new active set which includes the target cell. This step may occur any time after step 'j'.

n. The AT responds with a TrafficChannelComplete message to the target AN.

o. The target AN sends an A14-UATI Request message to the target PCF to request a UATI be assigned to the AT.

p. The target PCF assigns a UATI to the AT from its UATI pool and sends an A14-UATI Assignment messag including the assigned UATI and starts timer $T_{14\text{-}UATI\text{-}Assign}$.

q. The AN sends a UATIAssignment message to assign the UATI to the AT.

r. The AT sends a UATIComplete message to notify the AN that it received the UATIAssignment message. The target AN/PCF may initiate session negotiation and/or termination authentication procedures after this step if required. If a failure occurs, the A13-Handoff Status message may be sent indicating the type of failure.

s. Upon receipt of the UATIComplete message from the AT, the AN sends an A14-UATI Complete message to the PCF to notify the PCF that UATI assignment completed successfully. The AN starts timer $T_{14\text{-}UATI\text{-}Comp}$. The PCF stops timer $T_{14\text{-}UATI\text{-}Assign}$ upon receipt of the A14-UATI Complete message.

t. The PCF sends an A14-UATI Complete Ack message to the AN as an acknowledgment. The AN stops timer $T_{14\text{-}UATI\text{-}Comp}$.

u. The target BS may send an A9-AL Connected message to the target PCF and starts timer $T_{alc9}$. Connected/Connected Ack messages may be optional since PCF is already aware that that AT has arrived at target BS.

v. This step occurs if fast handoff procedures were not initiated in step 'f'. The PCF selects the PDSN sent by the source PCF in the A13-Handoff Request. If the target PCF cannot connect to the source PDSN, it selects an alternate PDSN using the PDSN selection algorithm. The target PCF sends an A11-Registration Request message to the PDSN. The message includes the MEI indication within a CVSE, a non-zero Lifetime value, accounting data (A10 Connection Setup and perhaps Active-Start Airlink records), and the ANID of the source PCF (PANID) and the ANID of the target PCF (CANID) within an NVSE. The target PCF starts timer $T_{regreq}$.

w. The PDSN validates the A11-Registration Request and accepts the connection by returning an A11-Registration Reply message with an accept indication and the Lifetime field set to the configured $T_{rp}$ value. The target PCF stops timer $T_{regreq}$.

x. The target PCF sends the A9-AL Connected Ack message in response to the A9-AL Connected message and stops timer $T_{alc9}$.

y. If the target PCF was unable to connect to the source PDSN, i.e. the PDSN that supported the call prior to the handoff, PPP connection establishment and MIP registration procedures (if supported) are performed.

The HRPD packet data session is now active at the target cell and packet data is exchanged between the AT and PDSN.

z. The target PCF sends an A13-Handoff Status message to the source PCF with a cause value indicating the successful completion of the hard handoff to the target network. This message may be sent earlier in the case of a hard handoff failure.

aa. The PCF sends an A9-Disconnect-A8 message to the AN, with a cause value set to "hard handoff completed" after the A13-Handoff Status message is received, and starts timer $T_{discon9}$. This message may be sent any time after step 'n'.

bb. The source AN sends an A9-Release-A8 message with the cause value set to "hard handoff completed", to the PCF to request the PCF to release the associated dedicated resources. The source AN starts timer $T_{rel9}$. The source PCF stops timer $T_{discon9}$.

cc. The source PCF sends an A11-Registration Request message, with Lifetime set to zero and the Active Stop AL record to the PDSN. The PCF starts timer $T_{regreq}$.

dd. The PDSN sends an A11-Registration Reply message to the source PCF. The source PCF closes the source A10 connection for the AT and stops timer $T_{regreq}$.

ee. The source PCF responds to the A9-Release-A8 message with an A9-Release-A8 Complete message. The AN stops timer $T_{rel9}$.

The exemplary signaling flow diagram of FIG. 4 depicts both A13 and A14 signaling. However, in the case where the source AN and the target AN are served by the same PCF (i.e., the source and target PCFs are the same single PCF), signaling such as the A13 signaling between source and target PCFs would not occur.

The exemplary signaling flow diagrams (FIGS. 3 and 4) above refer to a number of new messages such as the A13-Handoff Request, A13-Handoff Request Ack, A13-Handoff Status, A14-Handoff Required, A14-Handoff Required Ack, A14-Handoff Request, and A14-Handoff Request Ack. Exemplary definitions for these messages are provided below to enhance understanding and to illustrate specific embodiments that may be implemented. However, one of skill in the art will appreciate that various modifications and changes may be made to the specific embodiments described below without departing from the spirit and scope of the present invention.

A13 Message Definitions

A13-Handoff Request

This message is sent from the source PCF to the target PCF to request to request a hard handoff for an AT.

| Information Element | Element Direction | Type | |
|---|---|---|---|
| A13 Message Type | Source → Target | M | |
| Mobile Identity (MN ID) | Source → Target | O$^a$ | R |
| Sector ID (target) | Source → Target | O | R |
| Target Channel Info | Source → Target | O$^b$ | R |

-continued

| Information Element | Element Direction | Type | |
|---|---|---|---|
| PDSN IP Address | Source → Target | O$^c$ | R |
| Access Network Identifier | Source → Target | O$^d$ | R |
| Session State Information Record | Source → Target | O$^e$ | R |
| Security Layer Packet | Source → Target | O | R |
| Anchor PDSN Address | Source → Target | O$^f$ | C |
| Anchor P-P Address | Source → Target | O$^f$ | C |
| AI Version | Source → Target | O$^g$ | R |

$^a$This IE contains the mobile identifier of the AT for which the hard handoff is being requested.
$^b$This information element contains the target cell pilot and pilot strength information. Multiple instances of this element may be present.
$^c$This IE contains the IP address for the PDSN supporting the call at the source network.
$^d$This element contains the ANID for the source PCF.
$^e$This IE contains the Session State Information Record in use at the source network. Multiple copies of this information element may be included. If an attribute is not contained in the Session State Information Record, the target AN shall assume that the missing attribute(s) have the default values (specified for each attribute in each protocol).
$^f$These IEs included if fast handoff is supported.
$^g$This IE contains the air interface version in use at the source AN.

The following table shows the bitmap layout for the A13-Handoff Request message.

| 7 | 6 | 5 | 4 | 3 | 2 | 1 | 0 | Octet |
|---|---|---|---|---|---|---|---|---|
| ⇒ | | | A13 Message Type = [05H] | | | | | 1 |
| ⇒ | | Mobile Identity (MN ID): A13 Element Identifier = [05H] | | | | | | 1 |
| | | | Length = 10-15 digits | | | | | 2 |
| Identity Digit 1 = [0H-9H] (BCD) | | | | Odd/Even Indicator = [1, 0] | Type of Identity = [110] (MN ID) | | | 3 |
| Identity Digit 3 = [0H-9H] (BCD) | | | | Identity Digit 2 = [0H-9H] (BCD) | | | | 4 |
| ... | | | | ... | | | | ... |
| Identity Digit N + 1 = [0H-9H] (BCD) | | | | Identity Digit N = [0H-9H] (BCD) | | | | k |
| = [1111] (if even number of digits) | | | | Identity Digit N + 2 = [0H-9H] (BCD) | | | | k + 1 |
| ⇒ | | Sector ID: A13 Element Identifier = [03H] | | | | | | 1 |
| | | | Length = [10H] | | | | | 2 |
| (MSB) | | | Sector ID = <any value> | | | | | 3 |
| | | | | | | | | 4 |
| | | | ... | | | | | ... |
| | | | | | | | (LSB) | 18 |
| ⇒ | | Target Chennel Info: A13 Element Identifier = [11H] | | | | | | 1 |
| | | | Length [04H] | | | | | 2 |
| (MSB) | | | | | | | | 3 |
| | | | Channel [Any Value] | | | | | 4 |
| | | | | | | | (LSB) | 5 |
| Reserved | | | PilotStrength [Any Value] | | | | | 6 |
| ⇒ | | PDSN IP Address: A13 Element Identifier = [06H] | | | | | | 1 |
| | | | Length = [04H] | | | | | 2 |
| (MSB) | | | PDSN IP Address | | | | | 3 |
| | | | | | | | | 4 |
| | | | | | | | | 5 |
| | | | | | | | (LSB) | 6 |

-continued

| | | | |
|---|---|---|---|
| ⟹ Access Network Identifiers: A13 Element Identifier = [07H] | | | 1 |
| Type = 01H | | | 2 |
| Length = [05H] | | | 3 |
| Reserved | (MSB) | SID | 4 |
| | | (LSB) | 5 |
| (MSB) | NID | | 6 |
| | | (LSB) | 7 |
| (MSB) | PZID | (LSB) | 8 |

| | | |
|---|---|---|
| ⟹ Session State Information Record: A13 Element Identifier = [08H] | | 1 |
| (MSB) | Length = [variable] | 2 |
| | (LSB) | 3 |
| (MSB) | Session State Information Record | 4 |
| ... | ... | ... |
| | (LSB) | n |
| ⟹ Security Layer Packet: A13 Element Identifier = [02H] | | 1 |
| Length = [variable] | | 2 |
| (MSB) | Security Layer Packet | 3 |
| | | 4 |
| ... | ... | ... |
| | (LSB) | n |
| ⟹ Anchor PDSN Address: A13 Element Identifier = [09H] | | 1 |
| Length = [04H] | | 2 |
| (MSB) | Anchor PDSN Address = <any value> | 3 |
| | | 4 |
| | | 5 |
| | (LSB) | 6 |

| | | |
|---|---|---|
| ⟹ Anchor P-P Address: A13 Element Identifier = [10H] | | 1 |
| Length = [04H] | | 2 |
| (MSB) | Anchor P-P Address = <any value> | 3 |
| | | 4 |
| | | 5 |
| | (LSB) | 6 |
| ⟹ AI Version: A13 Element Identifer = [12H] | | 1 |
| Length [01H] | | 2 |
| AI Revision [00H-10H] | | 3 |

A13-Handoff Request Ack

This message is sent from the target PCF to the source PCF to acknowledge the hard handoff request for an AT.

| Information Element | Element Direction | | Type |
|---|---|---|---|
| A13 Message Type | Target → Source | | M |
| Mobile Identity (MN ID) | Target → Source | O[a] | R |
| Sector ID (target) | Target → Source | O[c] | R |
| Cause | Target PCF → Source PCF | O[d] | R |
| TCA BLOB | Target PCF → Source PCF | O[e] | R |

[a] This IE contains the mobile identifier of the AT for which the hard handoff is being requested.
[b]
[c] This information element contains the target network sector ID.
[d] This information element indicates if the hard handoff request was accepted or rejected by the target network.
[e] This information element contains the air interface TCA message coded to the version of the air interface in use at the source and is included when the handoff request was accepted by the target network.

The following table shows the bitmap layout for the A13-Handoff Request Ack message.

| 7 | 6 | 5 | 4 | 3 | 2 | 1 | 0 | Octet |
|---|---|---|---|---|---|---|---|---|
| ⇒ | | | A13 Message Type = [06H] | | | | | 1 |
| ⇒ | | Mobile Identity (MN ID): A13 Element Identifier = [05H] | | | | | | 1 |
| Length = 10-15 digits | | | | | | | | 2 |
| Identity Digit 1 = [0H-9H] (BCD) | | | | Odd/even Indicator = [1, 0] | Type of Identity = [110] (MN ID) | | | 3 |
| Identity Digit 3 = [0H-9H] (BCD) | | | | Identity Digit 2 = [0H-9H] (BCD) | | | | 4 |
| ... | | | | ... | | | | ... |
| Identity Digit N+1 = [0H-9H] (BCD) | | | | Identity Digit N = [0H-9H] (BCD) | | | | k |
| = [11111] (if even number of digits) | | | | Identity Digits N + 2 = [0H-9H] (BCD) | | | | k + 1 |
| ⇒ | | Sector ID: A13 Element Identifier = [03H] | | | | | | 1 |
| Length = [10H] | | | | | | | | 2 |
| (MSB) Sector ID = <any value> | | | | | | | | 3 |
| | | | | | | | | 4 |
| | | | | | | | (LSB) | 18 |
| ⇒ | | Cause: A13 Element Identifier = [04H] | | | | | | 1 |
| Length = [01H] | | | | | | | | 2 |
| Cause Value = [06H] (Hard Handoff Request Accepted), [07H] (Hard Handoff Request Rejected)] | | | | | | | | 3 |
| ⇒ | | TCA BLOB: A13 Element Identifier = [15H] | | | | | | 1 |
| TCA Information Bit-Exact Length-Octet Count = [00H-FFH] | | | | | | | | 2 |
| Reserved = [00000] | | | | | TCA Information Bit-Exact Length-Fill Bits = [000-111] | | | 3 |
| (MSB) | | | | | | | | 4 |
| TCA Information Content = <Any Value> | | | | | | | | ... |
| Seventh Fill Bit-if needed | Sixth Fill Bit-if needed | Fifth Fill Bit-if needed | Fourth Fill Bit-if needed | Third Fill Bit-if needed | Second Fill Bit-if needed | First Fill Bit-if needed | | k |

A13-Handoff Status

This message is sent from the target PCF to the source PCF and indicates whether if a hard handoff for an AT was completed to the target AN.

The following table shows the bitmap layout for the A13-Handoff Status message.

| Information Element | Element Direction | Type | |
|---|---|---|---|
| A13 Message Type | Target → Source | M | |
| Mobile Identity (MN ID) | Target → Source | O | R |
| Cause | Target → Source | O[a] | R |

[a]This information element indicates whether the hard handoff was completed to the target network.

The following table shows the bitmap layout for the A13-Handoff Status message.

| 7 | 6 | 5 | 4 | 3 | 2 | 1 | 0 | Octet |
|---|---|---|---|---|---|---|---|---|
| ⇒ A13 Message Type = [06H] | | | | | | | | 1 |
| ⇒ Mobile Identity (MN ID): A13 Element Identifier = [05H] | | | | | | | | 1 |
| Length = 10-15 digits | | | | | | | | 2 |
| Identity Digit 1 = [0H-9H] (BCD) | | | Odd/even Indicator = [1, 0] | Type of Identity = [110] (MN ID) | | | | 3 |
| Identity Digit 3 = [0H-9H] (BCD) | | | | Identity Digit 2 = [OH-9H] (BCD) | | | | 4 |
| ... | | | | ... | | | | ... |
| Identity Digit N + 1 = [0H-9H] (BCD) | | | | Identity Digit N = [0H-9H] (BCD) | | | | k |
| = [11111] (if even number of digits) | | | | Identity Digits N + 2 = [0H-9H] (BCD) | | | | k + 1 |
| ⇒ Cause: A13 Element Identifier = [04H] | | | | | | | | 1 |
| Length = [01H] | | | | | | | | 2 |
| Cause Value = [05H (Requested session not authentic), 08H (Hard Handoff Completed), 09H (Hard Handoff Failed)] | | | | | | | | 3 |

A14 Message Definitions

A14-Handoff Required

This message is sent from a source AN to a source PCF to request a hard handoff for an AT to a new AN.

| Information Element | Element Direction | Type | |
|---|---|---|---|
| A14 Message Type | AN → PCF | M | |
| ATI (UATI 32) | AN → PCF | O | R |
| Correlation ID | AN → PCF | O[a] | C |
| Sector ID | AN → PCF | O[b] | R |
| Target Channel Info | AN → PCF | O[c] | R |
| AI Version | AN → PCF | O[d] | R |

[a]If this information element is included in this message, its value shall be returned in the corresponding information element in the A14-Handoff Accepte message sent in response to this message.

[b]This information element is used to identify the sector to handoff too.

[c]This information element contains the target cell pilot and pilot strength information. Multiple instances of this element may be present.

[d]This IE contains the air interface version in use at the source AN.

The following table shows the bitmap layout for the A14-Handoff Required message.

| 7 | 6 | 5 | 4 | 3 | 2 | 1 | 0 | Octet |
|---|---|---|---|---|---|---|---|---|
| ⟹ A14 Message Type = [39H] | | | | | | | | 1 |
| ⟹ ATI: A14 Element Identifier = [80H] | | | | | | | | 1 |
| Length = [05H] | | | | | | | | 2 |
| History Ind = [0H (Current)] | | | | ATI Type = [2H (UATI 32)] | | | | 3 |
| (MSB) | UATIColorCode = <any value> | | | | | | (LSB) | 4 |
| (MSB) | UATI024 = <any value> | | | | | | | 5 |
| | | | | | | | | 6 |
| | | | | | | | (LSB) | 7 |
| ⟹ Correlation ID: A14 Element Identifier = [13H] | | | | | | | | 1 |
| Length = [04H] | | | | | | | | 2 |
| (MSB) | Correlation Value = <any value> | | | | | | | 3 |
| | | | | | | | | 4 |
| | | | | | | | | 5 |
| | | | | | | | (LSB) | 6 |
| ⟹ Sector ID: A14 Element Identifier = [88H] | | | | | | | | 1 |
| Length = [11H] | | | | | | | | 2 |
| (MSB) | SectorID Discriminator = [01H (SectorID128)] | | | | | | (LSB) | 3 |
| (MSB) | Sector ID = <any value> | | | | | | | 4 |
| | | | | | | | | 5 |
| | | | | | | | | ... |
| | | | | | | | (LSB) | 19 |
| ⟹ Target Channel Info: A13 Element Identifier = [0xH] | | | | | | | | 1 |
| Length [04H] | | | | | | | | 2 |
| (MSB) | | | | | | | | 3 |
| Channel [Any Value] | | | | | | | | 4 |
| | | | | | | | (LSB) | 5 |
| Reserved | PilotStrength [Any Value] | | | | | | | 6 |
| ⟹ AI Version: A13 Element Identifier = [12H] | | | | | | | | 1 |
| Length [01H] | | | | | | | | 2 |
| AI Revision [00H-10H] | | | | | | | | 3 |

A14-Handoff Required Ack

This message is sent from the source PCF to the source AN to acknowledge an A14-Handoff Required message.

| Information Element | Element Direction | Type | |
|---|---|---|---|
| A14 Message Type | PCF → AN | M | |
| ATI (UATI 32) | PCF → AN | O | R |
| Correlation ID | PCF → AN | O[a] | C |
| Cause | PCF → AN | O[b] | C |
| TCA BLOB | PCF → AN | O[c] | R |

[a]This information element shall only be included if it was also included in the A14-Session Information Update message. This information element shall be set to the value received in that message.
[b]This information elements indicates whether the handoff request was accepted.
[c]This information element contains the air interface TCA message coded to the version of the air interface in use at the source and is included when the handoff request was accepted by the target network.

The following table shows the bitmap layout for the A14-Session Information Update Ack message.

| 7 | 6 | 5 | 4 | 3 | 2 | 1 | 0 | Octet |
|---|---|---|---|---|---|---|---|---|
| ⇒ A14 Message Type = [3AH] | | | | | | | | 1 |
| ⇒ ATI: A14 Element Identifier = [80H] | | | | | | | | 1 |
| Length = [05H] | | | | | | | | 2 |
| History Ind = [OH (Current)] | | | | ATI Type = [2H (UATI 32)] | | | | 3 |
| (MSB) | UATIColorCode = <any value> | | | | | | (LSB) | 4 |
| (MSB) | UATI024 = <any value> | | | | | | | 5 |
| | | | | | | | | 6 |
| | | | | | | | (LSB) | 7 |
| ⇒ Correlation ID: A14 Element Identifier = [13H] | | | | | | | | 1 |
| Length = [04H] | | | | | | | | 2 |
| (MSB) | Correlation Value = <any value> | | | | | | | 3 |
| | | | | | | | | 4 |
| | | | | | | | | 5 |
| | | | | | | | (LSB) | 6 |
| ⇒ Cause: A14 Element Identifier = [04H] | | | | | | | | 1 |
| Length = [01H] | | | | | | | | 2 |
| Cause Value = [06H (Handoff Request Accepted), 07H (Handoff Request Rejected)] | | | | | | | | 3 |
| TCA BLOB: A14 Element Identifier = [xxH] | | | | | | | | 1 |
| TCA Information Bit-Exact Length-Octet Count = [00H-FFH] | | | | | | | | 2 |
| Reserved = [00000] | | | | | TCA Information Bit-Exact Length - Fill Bits = [000-111] | | | 3 |
| (MSB) | | | | | | | | |
| TCA Information Content = <Any Value> | | | | | | | | ... |
| | Seventh Fill Bit-if needed | Sixth Fill Bit-if needed | Fifth Fill Bit-if needed | Fourth Fill Bit-if needed | Third Fill Bit-if needed | Second Fill Bit-if needed | First Fill Bit-if needed | k |

A14-Handoff Request

This message is sent from the target PCF to the target AN to request a hard handoff.

| Information Element | Element Direction | Type | |
|---|---|---|---|
| A14 Message Type | PCF → AN | M | |
| MN_ID | PCF -> AN | O[a] | R |
| Correlation ID | PCF → AN | O | R |
| Sector ID | PCF → AN | O | R |
| Session State Information Record | PCF → AN | O[c] | R |
| A14 Indicators | PCF → AN | O | R |
| Target Channel Info | PCF → AN | O[d] | R |
| AI Version | PCF → AN | O[e] | R |

[a] If this information element is included in this message, its value shall be returned in the corresponding information element in the A14-Handoff Request Ack message sent in response to this message.
b. This information element is included if the PCF indicates a precise paging area. If this information element is included, the AT shall be paged on at least all sectors indicated in this list.
[c] Multiple copies of this information element may be included.
[d] This information element contains the target cell pilot and pilot strength information. Multiple instances of this element may be present.
[e] This IE contains the air interface version in use at the source AN.

The following table shows the bitmap layout for the A14-Request Request message.

| 7 | 6 | 5 | 4 | 3 | 2 | 1 | 0 | Octet |
|---|---|---|---|---|---|---|---|---|
| ⇒ | A14 Message Type = [2EH] | | | | | | | 1 |
| ⇒ | Mobile Identity (MN ID): A13 Element Identifier = [8EH] | | | | | | | 1 |
| Length = 10-15 digits | | | | | | | | 2 |
| Identity Digit 1 = [0H-9H] (BCD) | | | | Odd/even Indicator = [1, 0] | | | Type of Identity = [110] (MN ID) | 3 |
| Identity Digit 3 = [0H-9H] (BCD) | | | | Identity Digit 2 = [0H-9H] (BCD) | | | | 4 |
| ... | | | | ... | | | | ... |
| Identity Digit N+1 = [0H-9H] (BCD) | | | | Identity Digit N = [0H-9H] (BCD) | | | | k |
| = [11111] (if even number of digits) | | | | Identity Digits N + 2 = [0H-9H] (BCD) | | | | k + 1 |
| ⇒ | Correlation ID: A14 Element Identifier = [13H] | | | | | | | 1 |
| Length = [04H] | | | | | | | | 2 |
| (MSB) | Correlation Value = <any value> | | | | | | | 3 |
| | | | | | | | | 4 |
| | | | | | | | | 5 |
| | | | | | | | (LSB) | 6 |
| ⇒ | Sector ID (Registered sector): A14 Element Identifier = [88H] | | | | | | | 1 |
| Length = [11H] | | | | | | | | 2 |
| (MSB) | SectorID Discriminator = [01H (SectorID 128)] | | | | | | (LSB) | 3 |
| (MSB) | Sector ID = <any value> | | | | | | | 4 |
| | | | | | | | | 5 |
| | | ... | | | | | | ... |
| | | | | | | | (LSB) | 19 |
| Session State Information Record: A14 Element Identifier = [8AH] | | | | | | | | 1 |
| (MSB) | Length = [variable] | | | | | | | 2 |
| | | | | | | | (LSB) | 3 |
| (MSB) | Session State Information Record | | | | | | | 4 |
| | | ... | | | | | | ... |
| | | | | | | | (LSB) | n |
| ⇒ | A14 Indicators : A14 Element Identifier = [82H] | | | | | | | 1 |
| Length = [01H] | | | | | | | | 2 |
| Reserved = [000] | | | Keep Alive Indicator = [N/A] | Data Ready Indicator = [N/A] | Paging Type Indicator = [N/A] | A15 Paging Inhibitor = [N/A] | Authentication Required = [0,1] | 3 |
| ⇒ | Target Channel Info: A13 Element Identifier = [xxH] | | | | | | | 1 |
| Length = [04H] | | | | | | | | 2 |
| (MSB) | | | | | | | | 3 |
| Channel [Any Value] | | | | | | | | 4 |
| | | | | | | | (LSB) | 5 |
| Reserved | PilotStrength [Any Value] | | | | | | | 6 |
| ⇒ | AI Version: A13 Element Identifier = [xxH] | | | | | | | 1 |
| Length = [01H] | | | | | | | | 2 |
| AI Revision [00H-10H] | | | | | | | | 3 |

A14-Handoff Request Ack

This message is sent from a target AN to a target PCF to acknowledge a hard handoff request.

| Information Element | Element Direction | Type | |
|---|---|---|---|
| A14 Message Type | AN → PCF | M | |
| Correlation ID | AN → PCF | $O^a$ | C |
| Cause | AN → PCF | $O^b$ | C |
| TCA BLOB | AN → PCF | $O^c$ | R |

$^b$This information element indicates if the hard handoff request was accepted or rejected by the target AN.
$^c$This information element contains the air interface TCA message coded to the version of the air interface in use at the source and is included when the handoff request was accepted by the target network.

The following table shows the bitmap layout for the A14-Handoff Request Ack message.

| 7 | 6 | 5 | 4 | 3 | 2 | 1 | 0 | Octet |
|---|---|---|---|---|---|---|---|---|
| ⇒ | A14 Message Type = [xxH] | | | | | | | 1 |
| ⇒ | Correlation ID: A14 Element Identifier = [13H] | | | | | | | 1 |
| Length = [04H] | | | | | | | | 2 |
| MSB) | Correlation Value = <any value> | | | | | | | 3 |
| | | | | | | | | 4 |
| | | | | | | | | 5 |
| | | | | | | | (LSB) | 6 |
| ⇒ | Sector ID (Registered sector): A14 Element Identifier = [88H] | | | | | | | 1 |
| Length = [11H] | | | | | | | | 2 |
| MSB) | SectorID Discriminator = [01H (SectorID128)] | | | | | | (LSB) | 3 |
| Sector ID = <any value> | | | | | | | | 4 |
| | | | | | | | | ... |
| | | | | | | | (LSB) | 19 |
| ⇒ | Sector ID List: A14 Element Identifier = [81H] | | | | | | | 1 |
| Length = [variable] | | | | | | | | 2 |
| SectorID Discriminator = [01H (SectorID 128), 02H (SectorID32)] | | | | | | | | 3 |
| IF (SectorID Discriminator = 01 H), SectorID128 Entry {1+: | | | | | | | | |
| MSB) | SectorID128 = <any value> | | | | | | | k |
| Sector ID = <any value> | | | | | | | | k+1 |
| | | | | | | | | ... |
| | | | | | | | (LSB) | k+15 |
| } OR IF (SectorID Discriminator = 02 H), SectorID32 Entry {1+: | | | | | | | | |
| MSB) | ColorCode = <any value> | | | | | | (LSB) | k |
| MSB) | SectorID128 = <any value> | | | | | | | k+1 |
| | | | | | | | | k+2 |
| | | | | | | | (LSB) | k+3 |
| } SectorID32 Entry | | | | | | | | |
| ⇒ | TCA BLOB: A14 Element Identifier = [xxH] | | | | | | | 1 |
| TCA Information Bit-Exact Length-Octet Count = [00H-FFH] | | | | | | | | 2 |
| Reserved = [00000] | | | | TCA Information Bit-Exact Length-Fill Bits = [000-111] | | | | 3 |
| MSB) | | | | | | | | 4 |
| TCA Information Content = <Any Value> | | | | | | | | ... |
| | Seventh Fill Bit- if needed | Sixth Fill Bit-if needed | Fifth Fill Bit-if needed | Fourth Fill Bit- if needed | Third Fill Bit-if needed | Second Fill Bit-if needed | First Fill Bit-if needed | k |

A13 Information Element Definitions
Information Element Identifiers

The table includes the Information Element Identifier (IEI) coding which distinguishes one element from another. The table also includes a section reference indicating where the element coding can be found.

| Element Name | IEI (Hex) | IEI (Binary) |
| --- | --- | --- |
| UATI 128 | 01H | 0000 0001 |
| Security Layer Packet | 02H | 0000 0010 |
| Sector ID | 03H | 0000 0011 |
| Cause | 04H | 0000 0100 |
| Mobile Identity (MN ID) | 05H | 0000 0101 |
| PDSN IP Address | 06H | 0000 0110 |
| Access Network Identifiers | 07H | 0000 0111 |
| Session State Information Record | 08H | 0000 1000 |
| Anchor PDSN Address | 09H | 0000 1001 |
| Anchor P-P Address | 10H | 0001 0000 |
| Target Channel Info | 11H | 0001 0001 |
| AI Version | 12H | 0001 0010 |
| TCA BLOB | 13H | 0001 0011 |

A13 Message Type

The A13 Message Type information element is used to indicate the type of message on the A13 interface.

| A13 Message Name | A13 Message Type |
| --- | --- |
| . | . |
| . | . |
| . | . |
| A13-Handoff Request | 05H |
| A13-Handoff Request Ack | 06H |
| A13-Handoff Status | 07H |

Cause

This information element is used to indicate the reason for occurrence of a particular event and is coded as follows.

Cause Value This field is set to the range of value as follows:

| Hex Values | Cause Value Meaning |
| --- | --- |
| 01 | Protocol subtype not recognized |
| 02 | Protocol subtype attribute(s) not recognized |
| 03 | Protocol subtype attribute(s) missing |
| 04 | Requested session not found |
| 05 | Requested session not authentic |
| 06 | Hard Handoff Request Accepted |
| 07 | Hard Handoff Request Rejected |
| 08 | Hard Handoff Completed |
| 09 | Hard Handoff Failed |

| 7 | 6 | 5 | 4 | 3 | 2 | 1 | 0 | Octet |
| --- | --- | --- | --- | --- | --- | --- | --- | --- |
| A13 Message Identifier =[04H] | | | | | | | | 1 |
| Length | | | | | | | | 2 |
| (MSB) | Cause Value | | | | | | LSB | 3 |

Length: This field contains the number of octets in this information element following this field as a binary number.

Anchor PDSN Address
This element contains the A11 interface IPv4 address of the anchor PDSN address and is used for fast handoff.

| 7 | 6 | 5 | 4 | 3 | 2 | 1 | 0 | Octet |
|---|---|---|---|---|---|---|---|---|
| \multicolumn{8}{c|}{A13 Message Identifier} | 1 |
| Length | | | | | | | | 2 |
| (MSB) | Anchor P-P Address | | | | | | | 3 |
| | | | | | | | | 4 |
| | | | | | | | | 5 |
| | | | | | | | LSB | 6 |

Length: This field indicates the number of octets in this element following the Length field.

Anhor P-P Address: This field contains a P-P interface IPv4 address for an anchor PDSN. Refer to [IS-835-C].

Anchor P-P Address
This element contains the P-P interface IPv4 address for the of the anchor PDSN for fast handoff.

| 7 | 6 | 5 | 4 | 3 | 2 | 1 | 0 | Octet |
|---|---|---|---|---|---|---|---|---|
| \multicolumn{8}{c|}{A13 Message Identifier} | 1 |
| Length | | | | | | | | 2 |
| (MSB) | Anchor P-P Address | | | | | | | 3 |
| | | | | | | | | 4 |
| | | | | | | | | 5 |
| | | | | | | | LSB | 6 |

Length: This field indicates the number of octets in this element following the Length field.

Anhor P-P Address: This field contains a P-P interface IPv4 address for an anchor PDSN. Refer to [IS-835-C].

Target Channel Info
This information element contains the target cell pilot and pilot strength information.

| 7 | 6 | 5 | 4 | 3 | 2 | 1 | 0 | Octet |
|---|---|---|---|---|---|---|---|---|
| \multicolumn{8}{c|}{A13 Message Identifier = [11H]} | 1 |
| Length | | | | | | | | 2 |
| (MSB) | | | | | | | | 3 |
| Channel | | | | | | | | 4 |
| | | | | | | | LSB | 5 |
| Reserved | PilotStrength | | | | | | | 6 |

Length       This field contains the number of octets in this information element following this field as a binary number.

Channel      This field contains the channel corresponding to the target's pilot and is coded as specified in the TIA-856 RouteUpdate message.

PilotStrength   This field contains the strength of the pilot and is coded as specified in the TIA-856 RouteUpdate message AI Version This information element indicates AI version supported at the source network.

| 7 | 6 | 5 | 4 | 3 | 2 | 1 | 0 | Octet |
|---|---|---|---|---|---|---|---|---|
| A13 Message Identifier = [12H] | | | | | | | | 1 |
| Length | | | | | | | | 2 |
| AI Revision | | | | | | | | 3 |

Length This field contains the number of octets in this information element following this field as a binary number.

Channel This field indicates the AI in use at the source so the target can determine how to format the TrafficChannelAssignment message. It is coded as follows:

1: TIA-856-0
2: TIA-856-A

TCA BLOB

This information element contains the TIA-856 Traffic-ChannelAssignment message formatted per the air interface version (e.g., per TIA-856 section 6.6.6.2.2 or TIA-856-A section 9.7.6.2.2) in use at the source network.

| 7 | 6 | 5 | 4 | 3 | 2 | 1 | 0 | Octet |
|---|---|---|---|---|---|---|---|---|
| A13 Message Identifier | | | | | | | | 1 |
| TCA Information Bit-Exact Length-Octet Count | | | | | | | | 2 |
| Reserved | | | | TCA Information Bit-Exact Length -Fill Bits | | | | 3 |
| (MSB) | | | | | | | | 4 |
| TCA Information Content | | | | | | | | ... |
| Seventh Fill Bit-if needed | Sixth Fill Bit-if needed | Fifth Fill Bit-if needed | Fourth Fill Bit-if needed | Third Fill Bit-if needed | Second Fill Bit-if needed | First Fill Bit-if needed | | k |

TCA Information Bit-Exact Length—Octet Count:

This field contains the total number of octets in the TCA Information Content field represented as a binary value.

TCA Information Bit-Exact Length—Fill Bits:

This field contains a binary value indicating the number of fill bits contained in the last octet used for the TCA Information Content field.

TCA Information Content: The TCA Information Content field is coded per [TIA-856 per the version number supported at the source AN].

N'th Fill Bit—if Needed (Octet k):

If the 'TCA Information: Bit-Exact Length—Fill Bits' field contains a non-zero value, the indicated number of fill bits are set to '0' and occupy the low order bit positions of the last octet used for the TCA Information Content field.

9.6.6.1.6.6 in rev A indicates fields that need to be sent.

A14 Information Element Definitions
Information Element Identifiers

The table includes the Information Element Identifier (IEI) coding which distinguishes one element from another. The table also includes a section reference indicating where the element coding can be found.

| Element Name | IEI (Hex) | IEI (Binary) |
|---|---|---|
| . | . | . |
| . | . | . |
| . | . | . |
| UATI Color Code | 8DH | 1000 1101 |
| MN_ID | 8EH | 1000 1110 |

A14 Message Type

The A14 Message Type information element is used to indicate the type of message on the A14 interface.

| A14 Message Name | A14 Message Type |
|---|---|
| . | . |
| . | . |
| . | . |
| A14-Keep Alive Request Ack | 38H |
| A14-Handoff Required | 39H |
| A14-Handoff Required Ack | 40H |
| A14-Handoff Request | 41H |
| A14-Handoff Request Ack | 42H |

Cause

This information element is used to indicate the reason for occurrence of a particular event and is coded as follows.

| 7 | 6 | 5 | 4 | 3 | 2 | 1 | 0 | Octet |
|---|---|---|---|---|---|---|---|---|
| A14 Element Identifier = [04H] | | | | | | | | 1 |
| Length | | | | | | | | 2 |
| (MSB) | Cause Value | | | | | | (LSB) | 3 |

Length  This field contains the number of octets in this information element following this field as a binary number.

Cause Value  This field is set to the range of values as follows:

| Hex Values | A14 Cause Value Meaning |
|---|---|
| 01 | Paging completed successfully |
| 02 | Paging failed |
| 03 | Authentication succeeded |
| 04 | Authentication failure |
| 05 | Session unreachable |
| 06 | All session resources busy |
| 07 | PCF resource unavailable |
| 08 | AN-AAA unreachable |
| 09 | Invalid session information |
| 0A | AN resource unavailable |
| 0B | Equipment failure |
| 0C | Air link lost |
| 0D | Protocol error |
| 0E | Protocol configuration failure |
| 0F | Protocol negotiation failure |
| 10 | Session lost |
| 11 | Hard Handoff Request Accepted |
| 12 | Hard Handoff Request Rejected |
| 14 | Normal release |
| (all others) | Reserved |

Mobile Identity (MN ID)

This information element is used to provide the AT's Mobile Node Identification (MN ID).

| 7 | 6 | 5 | 4 | 3 | 2 | 1 | 0 | Octet |
|---|---|---|---|---|---|---|---|---|
| A13 Element Identifier = [8EH] | | | | | | | | 1 |
| Length = 10-15 digits | | | | | | | | 2 |
| Identity Digit 1 = [0H-9H] (BCD) | | | | Odd/even Indicator = [1, 0] | Type of Identity = [110] (MN ID) | | | 3 |
| Identity Digit 3 = [0H-9H] (BCD) | | | | Identity Digit 2 = [0H-9H] (BCD) | | | | 4 |
| ... | | | | ... | | | | ... |
| Identity Digit N+1 = [0H-9H] (BCD) | | | | Identity Digit N = [0H-9H] (BCD) | | | | n |
| = [11111] (if even number of digits) | | | | Identity Digits N + 2 = [0H-9H] (BCD) | | | | n + 1 |

Length This field contains the number of octets in this information element following this field as a binary number.

What is claimed is:

1. A method to facilitate hard handoff of an access terminal (AT) between a source High Rate Packet Data (HRPD) radio access network (RAN) and a target HRPD RAN, the method comprising:
   receiving, by the target RAN from the source RAN, a handoff request for the AT, involved in an active HRPD packet data session at the source ran, to enable the AT to handoff without the session transitioning to a dormant mode or dropping;
   receiving, by the target RAN from the AT, traffic channel complete signaling;
   sending, by the target RAN to the AT in response to the traffic channel complete signaling, an assignment of a unicast access terminal identifier (UATI) for the AT;
   supporting, by the target RAN, the HRPD packet data session of the AT in an active model;
   sending, by the target RAN to the source RAN, a handoff request acknowledgment that indicates that the handoff request was accented by the target RAN, wherein the handoff request acknowledgment comprises handoff-related information from the group consisting of a mobile node identifier of the AT, a handoff target sector identifier, and at least a portion of a traffic channel assignment message to be sent to the AT.

2. The method of claim 1, wherein the handoff request comprises handoff-related information from the group consisting of a mobile node identifier of the AT, a handoff target sector identifier, target channel information, a serving packet data serving node (PDSN) internet protocol (IP) address, a source access network identifier, a session state information record for the HRPD packet data session, a security layer packet, an anchor PDSN address, an anchor P-P address, and an air interface version indicator.

3. The method of claim 1, wherein receiving traffic channel complete signaling comprises receiving traffic channel complete signaling using a source RAN UATI for the AT.

4. The method of claim 3, wherein the source RAN UATI for the AT is received in the handoff request.

5. The method of claim 1, wherein
   sending the handoff request acknowledgment comprises generating, for the handoff request acknowledgment, at least a portion of a traffic channel assignment message to be sent to the AT by the source RAN.

6. The method of claim 5, wherein
   generating the at least a portion of the traffic channel assignment message comprises formatting the at least a portion of the traffic channel assignment message according to an air interface version used by the source RAN.

7. The method of claim 1, further comprising:
   receiving, by the target RAN from the AT in response to the assignment of the UATI, UATI complete signaling to acknowledge the assignment.

8. The method of claim 1, further comprising:
   sending, by the target RAN to a packet data serving node (PDSN) supporting the session, a request to establish a data connection for the session;
   receiving, by the target RAN from the PDSN supporting the session, an indication that the data connection is accepted.

9. The method of claim 1, further comprising:
   sending, by the target RAN to the source RAN, handoff status signaling that indicates that the AT has successfully handed off to the target RAN.

10. A method to facilitate hard handoff of an access terminal (AT) between a source High Rate Packet Data (HRPD) access network (AN) and a target HRPD AN, wherein the source AN is supported by a source packet control function (PCF) and the target AN is supported by a target PCF, the method comprising:
    receiving, by the target PCF from the source PCF, a PCF handoff request for the AT, involved in an active HRPD packet data session, to enable the AT to handoff without the session transitioning to a dormant mode or dropping;
    sending, by the target PCF to the target AN, an AN handoff request based on the PCF handoff request received for the AT;

receiving, by the target PCF from the target AN, an indication that the target AN has accepted the handoff of the AT;

sending, by the target PCF to the source PCF, a PCF handoff request acknowledgment that indicates that the PCF handoff request was accepted by the target PCF;

receiving, by the target PCF from the target AN, a request for a unicast access terminal identifier (UATI) for the AT;

sending, by the target PCF to the target AN, a UATI assignment for the AT;

sending, by the target PCF to a packet data serving node (PDSN) supporting the session, a request to establish a data connection for the session;

supporting, by the target PCF, the HRPD packet data session of the AT in an active mode, wherein the AN handoff request comprises handoff-related information from the group consisting of an AT identifier, a signaling correlation identifier, a handoff target sector identifier, a session state information record for the HRPD packet data session, a source AN UATI for the AT, A14-specific indicators, target channel information, and an air interface version indicator.

11. The method of claim 10, wherein the PCF handoff request comprises handoff-related information from the group consisting of a mobile node identifier of the AT, a handoff target sector identifier, target channel information, a serving PDSN internet protocol (IP) address, a source access network identifier, a session state information record for the HRPD packet data session, a security layer packet, an anchor PDSN address, an anchor P-P address, and an air interface version indicator.

12. The method of claim 10, wherein the session state information record for the HRPD packet data session comprises the source AN UATI for the AT to be used by the target AN in acquiring the AT.

13. The method of claim 10, wherein the indication that the target AN has accepted the handoff of the AT comprises handoff-related information from the group consisting of a signaling correlation identifier and at least a portion of a traffic channel assignment message to be sent to the AT.

14. The method of claim 10, further comprising:
receiving, by the target PCF from the PDSN supporting the session, an indication that the data connection is accepted.

15. The method of claim 10, further comprising:
sending, by the target PCF to the source PCF, handoff status signaling that indicates that the AT has successfully handed off to the target AN.

16. A target High Rate Packet Data (HRPD) radio access network (RAN) for facilitating a hard handoff of an access terminal (AT) from a source HRPD RAN, the target HRPD RAN comprising:
an access network (AN); and
a packet control function (PCF), communicatively coupled to the AN,
wherein the AN is adapted to receive, from the source RAN, a handoff request for the AT, involved in an active HRPD packet data session, to enable the AT to handoff without the session transitioning to a dormant mode or dropping,
wherein the AN is adapted to receive, from the AT, traffic channel complete signaling,
wherein the AN is adapted to send, to the AT in response to the traffic channel complete signaling, an assignment of a unicast access terminal identifier (UATI) for the AT,
wherein the AN and PCF are adapted to support the HRPD packet data session of the AT in an active mode, and
wherein the AN is further adapted to send to the source RAN a handoff request acknowledgment that indicates that the handoff request was accepted by the target RAN, wherein the handoff request acknowledgment comprises handoff-related information from the group consisting of a mobile node identifier of the AT, a handoff target sector identifier, and at least a portion of a traffic channel assignment message to be sent to the AT.

17. A target packet control function (PCF) for facilitating a hard handoff of an access terminal (AT) from a source High Rate Packet Data (HRPD) access network (AN) to a target HRPD AN, wherein the source AN is supported by a source PCF and the target AN is supported by the target PCF, the target PCF comprising:
a PCF network interface adapted to send and receive signaling to and from the target AN, the source PCF, and a packet data serving node (PDSN);
a processing unit, communicatively coupled to the PCF network interface,
adapted to receive, from the source PCF via the PCF network interface, a PCF handoff request for the AT, involved in an active HRPD packet data session, to enable the AT to handoff without the session transitioning to a dormant mode or dropping,
adapted to send, to the target AN via the PCF network interface, an AN handoff request based on the PCF handoff request received for the AT,
adapted to receive, from the target AN via the PCF network interface, an indication that the target AN has accepted the handoff of the AT,
adapted to send, to the source PCF via the PCF network interface, a PCF handoff request acknowledgment that indicates that the PCF handoff request was accepted by the target PCF,
adapted to receive, from the target AN via the PCF network interface, a request for a unicast access terminal identifier (UATI) for the AT,
adapted to send, to the target AN via the PCF network interface, a UATI assignment for the AT,
adapted to send, to the PDSN supporting the session via the PCF network interface, a request to establish a data connection for the session, and
adapted to support, via the PCF network interface, the HRPD packet data session of the AT in an active mode, wherein the AN handoff request comprises handoff-related information from the group consisting of an AT identifier, a signaling correlation identifier, a handoff target sector identifier, a session state information record for the HRPD packet data session, a source AN UATI for the AT, A14-specific indicators, target channel information, and an air interface version indicator.

* * * * *